US005253933A

United States Patent [19]

Walker

[11] Patent Number: 5,253,933

[45] Date of Patent: Oct. 19, 1993

[54] SPEAKER STAND

[76] Inventor: Daniel R. Walker, P.O. Box 5832, Napa, Calif. 94581-0832

[21] Appl. No.: 831,457

[22] Filed: Feb. 5, 1992

[51] Int. Cl.[5] ...................... A47B 91/00; F16M 11/38

[52] U.S. Cl. ................................ 312/351.7; 181/199; 297/1; 248/127; 381/188; 381/205

[58] Field of Search ............................ 312/7.1, 351.7; 248/127, 176, 676; 181/153, 199; 297/439, 1; 108/115; 381/88, 90, 188, 205

[56] References Cited

U.S. PATENT DOCUMENTS

| | | | |
|---|---|---|---|
| D. 261,708 | 11/1981 | Ligrano | D14/224 |
| D. 267,403 | 12/1982 | Gage | D14/224 |
| 2,066,378 | 1/1937 | Wright | 248/127 |
| 2,562,326 | 7/1951 | Moremen | 248/127 |
| 3,663,058 | 5/1972 | Hirsch | 297/439 |
| 3,801,055 | 4/1974 | Stenger | 248/176 |
| 3,892,441 | 7/1975 | Roeshman | 297/439 |
| 4,033,653 | 7/1977 | Doring et al. | 312/253 |
| 4,054,748 | 10/1977 | Balogh | 181/199 |

*Primary Examiner*—Peter M. Cuomo

*Assistant Examiner*—Flemming Saether

*Attorney, Agent, or Firm*—Richard C. Litman

[57] ABSTRACT

A speaker stand which facilitates the elevation of a speaker cabinet, thereby enhancing the quality of sound distribution for the listening audience. The speaker stand, which is preferably constructed of wood because of its reputation for having excellent acoustical qualities, is comprised of two basic components, an internal structure and an enclosure. The internal structure is comprised of a top lateral surface, a bottom lateral surface and two substantially upright u-shaped cross members assembled in a configuration of a cruciform. The internal structure fits within the enclosure in such a way that the underside of the top lateral surface of the enclosure makes contact only with the top lateral surface of the internal structure. The internal structure slightly elevates the enclosure to prevent it from touching the floor. The speaker stand is constructed to provide freedom of air flow within the chamber as well as allowing the air to freely enter and exit the chamber. It is this combination of structure and material which enables the speaker stand to absorb the vibration.

12 Claims, 4 Drawing Sheets

SPEAKER STAND

BACKGROUND OF THE INVENTION

1. Field of the Invention

The present invention relates to a speaker stand which elevates the speaker cabinet above the floor. More particularly, a speaker stand which absorbs the vibrations induced by the speaker cabinet.

2. Description of Related Art

A speaker cabinet usually houses a variety of speakers, such as a woofer, a mid-range, and a tweeter. The woofer produces a bass tone. It has a low frequency response. While the tweeter produces a treble tone. It has a high frequency response. The higher the frequency response, the more directional the sound travels and, on the converse, the lower the frequency response the less directional the sound travels. When the speaker is sitting on the floor, the base, having more non-directional characteristics, becomes boomy and has a tendency to echo. The treble, on the other hand, being very directional, is coupled to the floor and not directed towards the listeners ear. This audibly altered sound is often not the desired effect of the listening audience. By elevating the speaker above of the floor, the echo of the base is reduced. If elevated properly, the treble can be directed to produce the quality of sound desired by persons both seated or in a standing position.

To remedy this problem, speaker stands are commonly used to elevate the speaker cabinets above the floor. U.S. Pat. No. 4,033,653 to DORING ET AL. (issued Jul. 5, 1977) discloses a universal speaker stand that elevates the speaker cabinet above the floor. It is universal in that it may be adjusted to accommodate various size speaker cabinets. The stand is comprised of a rigid frame having four legs which are removably adjustable to support the base of the speaker cabinet. This stand, however, being a rigid frame, offers little absorption of the vibrations induced by the speaker cabinet. These vibrations also produce an adverse efects on the quality of sound.

Accordingly, one of the objects of this invention is to provide a speaker stand that will elevate speaker cabinets above the floor, thus producing a greater quality sound for the listener.

It is another object of the present invention to provide a speaker stand that will absorb the vibrations induced by the speaker cabinet, thus further improving the quality of the sound produced.

SUMMARY OF THE INVENTION

The above objects are accomplished in accordance with the present invention, a speaker stand which includes two basic components, an enclosure and an internal structure. The enclosure is basically for ornamental purposes. It conceals the internal structure. In other words, the internal structure functions independent of the enclosure.

The internal structure is characterized by its ability to absorb the vibrations produced by the speaker cabinet. It is comprised of a top lateral surface and a bottom lateral surface separated by substantially upright u-shaped members. This structure is constructed of a flexible material and has other properties which enable it to break up the vibrations.

The internal structure may be inserted into the enclosure. The underside of the top lateral surface of the enclosure is juxtaposed the top of the top lateral surface of the internal structure. The enclosure makes no other contact with the internal structure, nor does it contact the floor, therefore, it does not compromise the functionality of the internal structure.

The foregoing and other features, advantages and other objects of the invention may be more fully appreciated by the reference to the following detailed description and drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
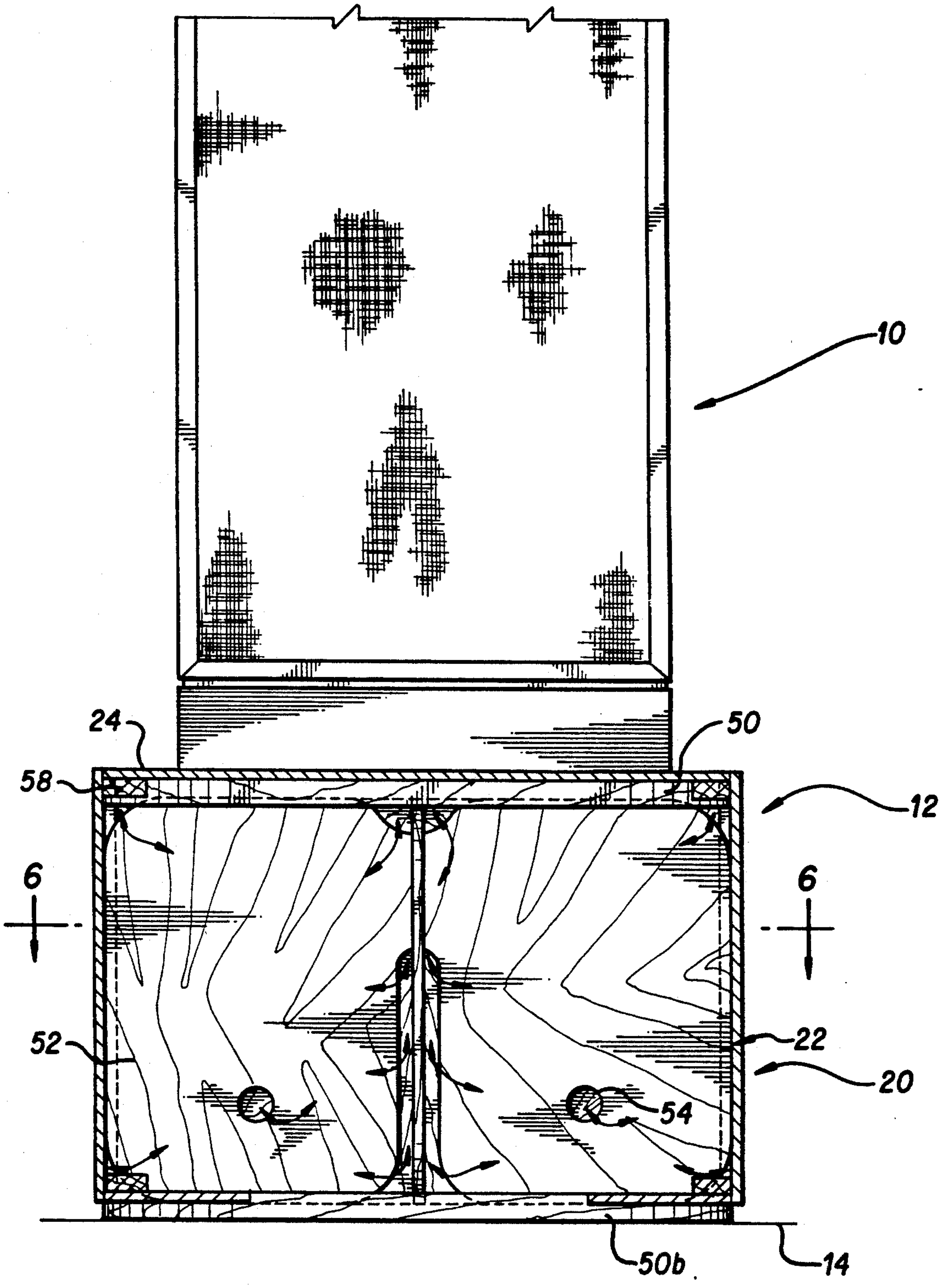
FIG. 1 is an environmental drawing of a front cutaway elevational view showing the first alternative embodiment of the present invention.
Figure 2:
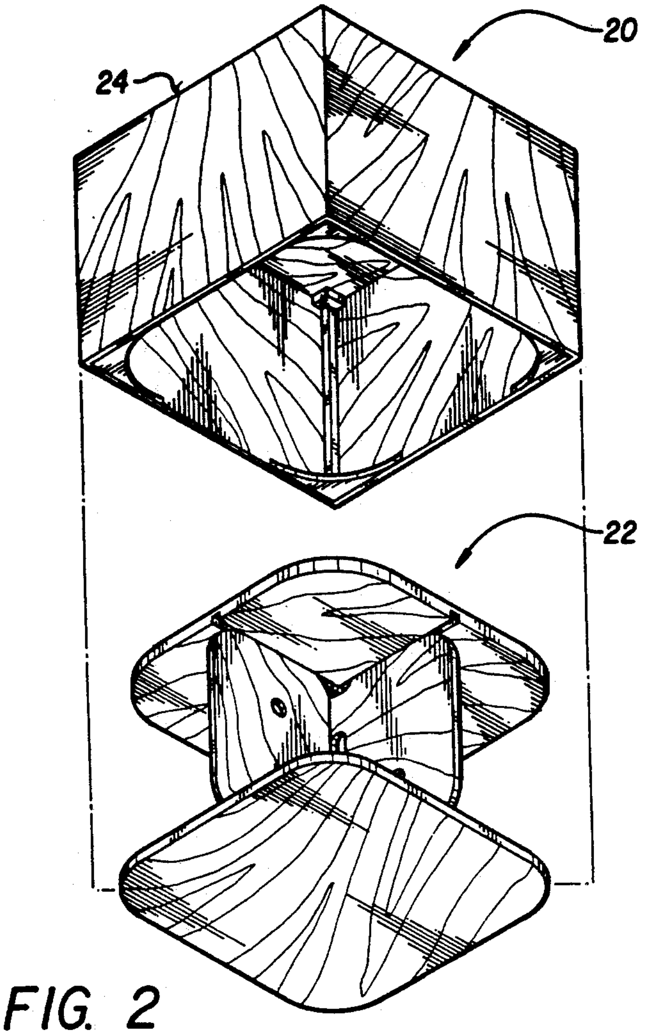
FIG. 2 is an exploded perspective view of the first alternative embodiment of the present invention, showing a cubic enclosure.

Now, referring to the drawing, particular FIG. 1 and FIG. 2, the speaker cabinet 10 rests upon the top of the speaker stand 12. The speaker stand 12 is preferably constructed of wood because of its inherent acoustical qualities. It is comprised of two basic components, an internal structure 22 and an enclosure 20.

The enclosure 20 has an opening in the bottom for the insertion the internal structure 22. The height of the internal structure 22 is slightly greater than that of the enclosure 20 to prevent the enclosure 20 from making contact with the floor 14.

Figure 5:
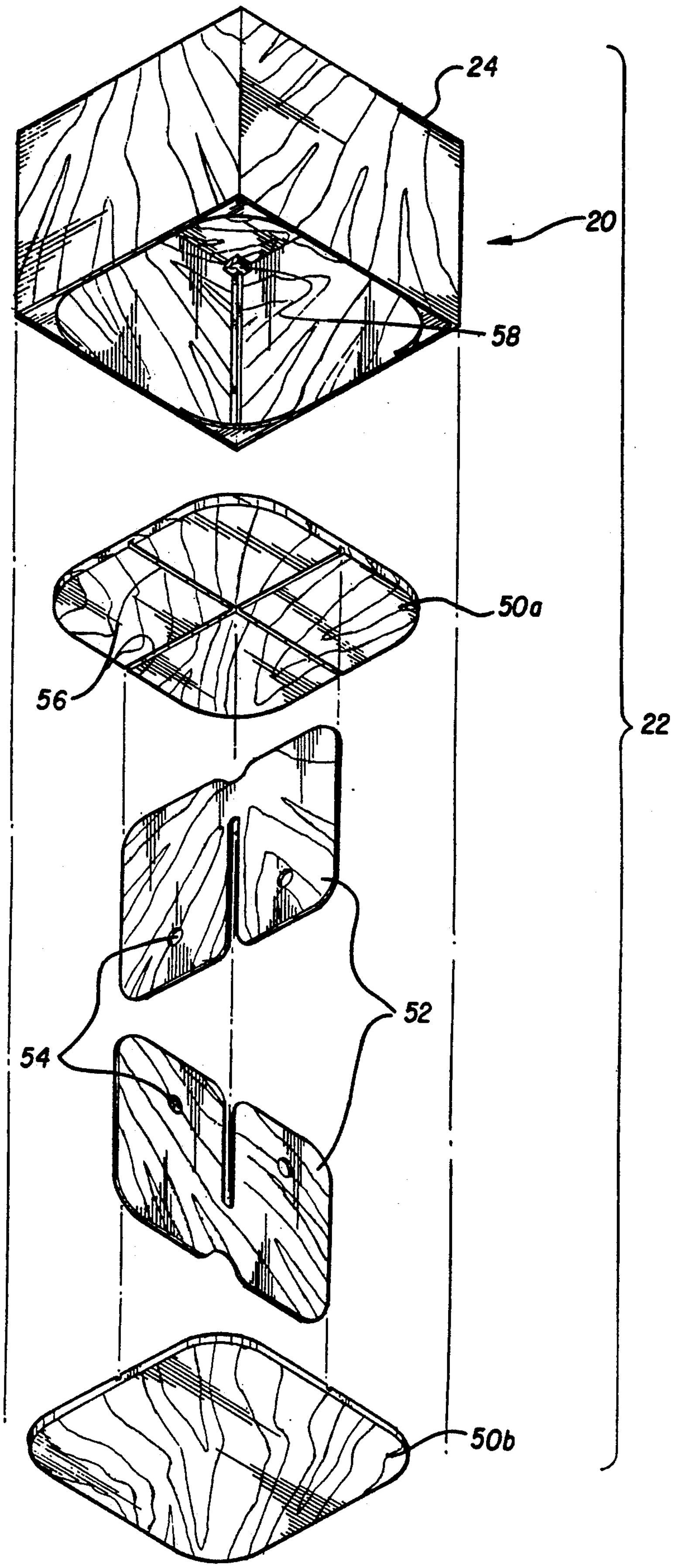
FIG. 5 is an exploded elevational perspective view of the first alternative embodiment of the present invention.
Figure 6:
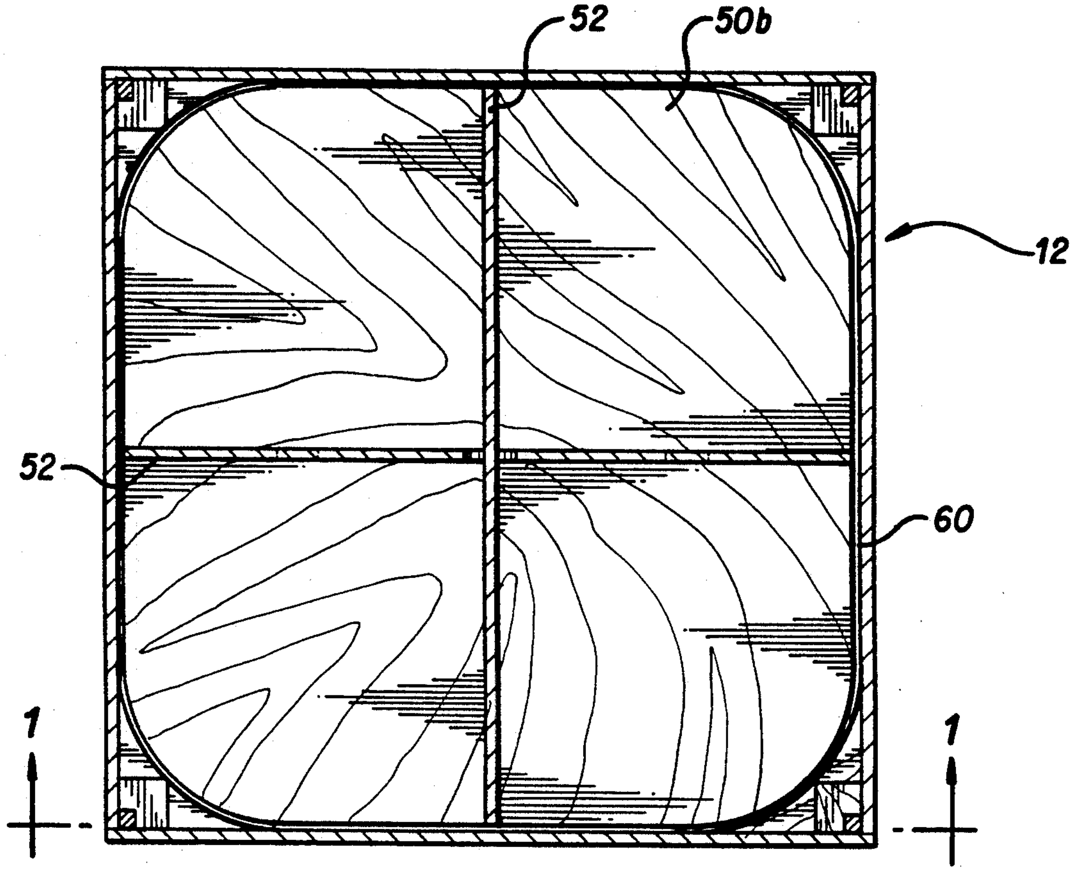
FIG. 6 the bottom plan view of the first alternative embodiment of the present invention.

Now, referring also to FIG. 5, the internal structure 22 is comprised of a top lateral surface 50*a* and a bottom lateral surface 50*b* separated by two substantially upright u-shaped intersecting members 52. The u-shaped members 52 form a cruciform when assembled with the top and bottom lateral surfaces 50*a*,50*b*. The internal structure 22 is assembled in a manner to prevent the u-shaped members 52 from making contact with one another. The u-shaped members 52 are provided with at least one aperture 54 to assist in breaking up the vibrations induced by the speaker cabinet 10. These u-shaped members 52 are fastened in the slots 56 in the top and bottom lateral surfaces 50*a*,50*b*.

The internal structure 22 makes no contact with the enclosure 20 with the exception that the underside of the top lateral surface 24 of the enclosure 20 is juxtaposed the top of the top lateral surface 50*a* of the internal structure 22. Guides 58 on the underside of the top lateral surface 24 of the enclosure 20 function to center and prevent the internal structure 22 from making any other contact with the enclosure 20. There is a close tolerance between the bottom lateral surface 50*b* of the internal structure 22 and the opening in the bottom of the enclosure 20 to provide an air passage for air to enter and exit adjacent the bottom of the speaker stand 12 through the crevice 60.

Based on the construction of the speaker stand 12, there exists a freedom of air flow within the enclosure 20. This freedom of air flow, the acoustical characteristics of wood, and the flexibility of the internal structure 22 break up and absorb the vibrations induced by the speaker cabinet 10.

Figure 3:
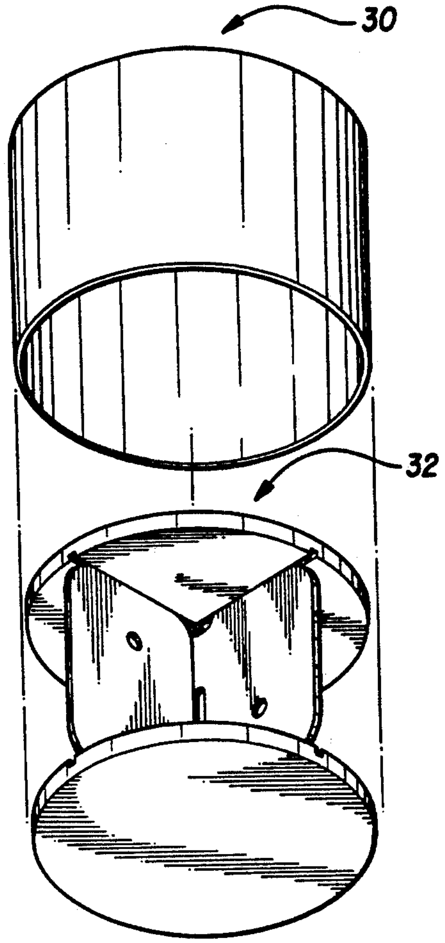
FIG. 3 is an exploded perspective view of a second alternative embodiment of the present invention, showing a cylindrical enclosure.
Figure 4:
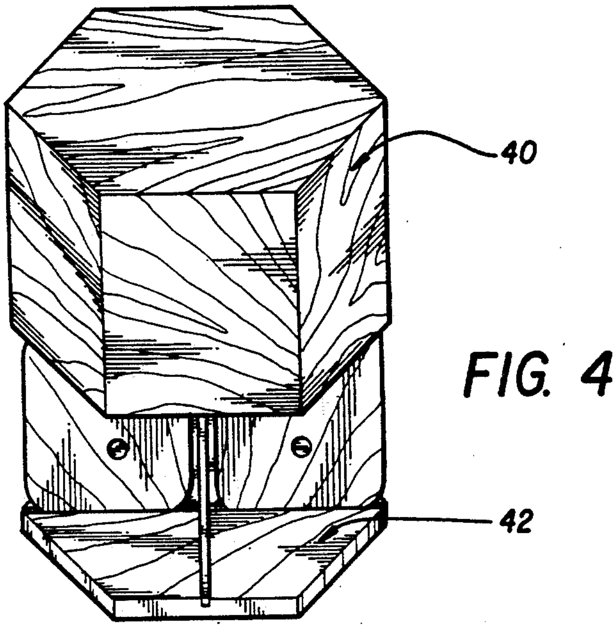
FIG. 4 is a exploded perspective view of a third alternative embodiment of the present invention, showing a hexagonal enclosure.

Referring to FIG. 2, FIG. 3, and FIG. 4, the speaker stand 12 is not limited by shape or size. It can be constructed as, but is not limited to, a cube 20, a cylinder 30, or a hexagon 40.

It is to be understood that the present invention is not limited to the sole embodiment described above, but encompasses any and all embodiments within the scope of the following claims.

I claim:

1. A speaker stand comprising:

an enclosure including a top lateral surface having an underside joined to the top edge of a peripheral wall defining a chamber with an opening in the bottom, an internal structure removably inserted into said bottom opening of said chamber, said internal structure includes a top lateral surface and a bottom lateral surface and two substantially upright cross members, said top lateral surface of said internal structure is juxtaposed to said underside of said top lateral surface of said enclosure, said bottom lateral surface of said internal structure supported above a horizontal planar supporting surface, said bottom of said enclosure and said bottom lateral surface of said internal structure are spaced upwardly apart, said enclosure including guides attached directly on said underside of said top lateral surface of said enclosure, said guides centering said internal structure within said chamber.

2. The device as defined in claim 1, wherein said substantially upright cross members form a symmetrical component when viewed from the top.

3. The device as defined in claim 1, wherein said substantially upright cross members form four quadrants, said quadrants defining four pie-shaped sub-cavities.

4. The device as defined in claim 1, wherein said substantially upright cross members are u-shaped panels, said u-shaped panels each having an aperture.

5. The device as defined in claim 4, wherein said aperture includes a plurality of apertures.

6. The device as defined in claim 4, wherein said top and bottom lateral surfaces are slotted to accommodate said u-shaped panels.

7. The device as claimed in claim 6, one of said u-shaped panels becoming an integral part of said top lateral surface and another of said u-shaped panels becoming an integral part of said bottom lateral surface of said internal structure.

8. The device as defined in claim 4, wherein said u-shaped panels do not directly communicate with one another.

9. The device as defined in claim 1, including a crevice between said opening in said bottom of said enclosure and said bottom lateral surface of said internal structure when said internal structure is inserted into said chamber.

10. The device as defined in claim 1, said speaker stand providing a platform, said platform elevating a speaker cabinet to a level which directs the sound substantially at the ear level of the listening audience, whereby the quality of sound produced by the speaker is enhanced.

11. The device as defined in claim 1, said internal structure providing means to absorb vibrations from the speaker cabinet.

12. The device as defined in claim 1, said enclosure making no contact with said internal structure with the exception that said underside of said top lateral surface of said enclosure rests on said top lateral surface of said internal structure.

* * * * *